R. DONALDSON.
Lime Kiln.
No. 1,476. Reissued May 19, 1863.
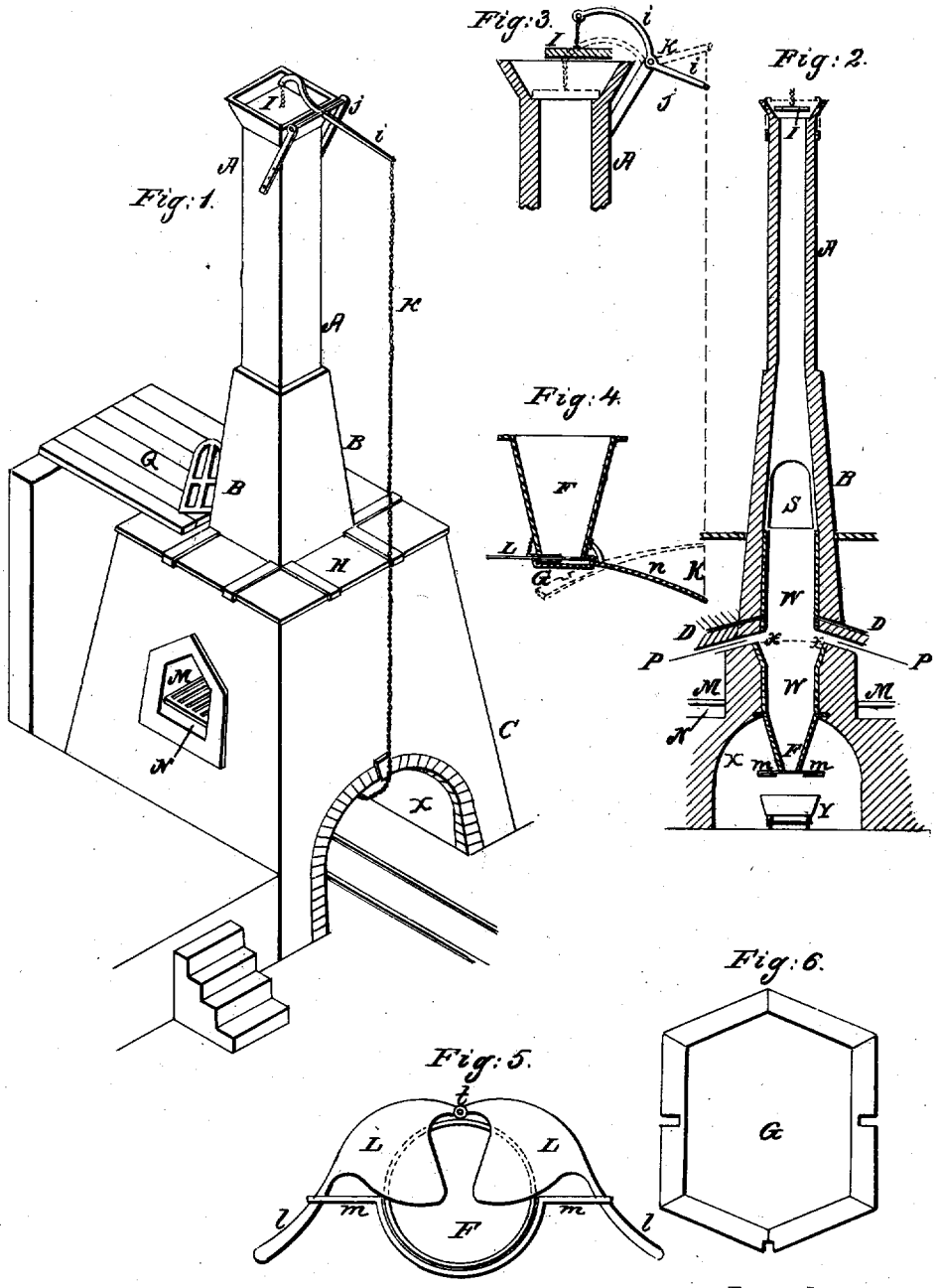
Witnesses:
Charles E. Foster
Wm. Albert Steel
Inventor:
Henry Howson
Atty. for R. Donaldson.
N. PETERS, Photo-Lithographer, Washington, D. C.

UNITED STATES PATENT OFFICE.

RICHARD DONALDSON, OF MOUNT NEBO, PENNSYLVANIA.

LIMEKILN.

Specification forming part of Letters Patent No. 441, dated February 19, 1861; Reissue No. 1,476, dated May 19, 1863.

*To all whom it may concern:*

Be it known that I, RICHARD DONALDSON, of Mount Nebo, Lancaster county, Pennsylvania, did obtain Letters Patent of the United States, dated the 19th day of February, 1861, for Improvements in Limekilns, which Letters Patent I now deem inoperative and invalid by reason of an insufficient and defective specification; and I do hereby declare the following to be a full, clear, and exact description of the same, reference being had to the accompanying drawings, and to the letters of reference marked thereon.

My invention relates to improvements in what are known as "perpetual" limekilns; and my improvements consists, first, in a cooler suspended beneath the kiln for the reception of the lime as it is burned, and for reducing the lime to a proper cool state prior to being discharged into trucks or barrows beneath the cooler, as described hereinafter; secondly, in certain levered blades for supporting the lime in the cooler and permitting it to fall from the same, as desired; thirdly, in a tray-like lid for effectually closing the cooler; fourthly, in constructing the interior of the kiln in the peculiar manner described hereinafter, so as to prevent particles of lime from choking up the flues for the passage of the products of combustion from the fire-places to the kiln; fifthly, in combining with a limekiln, substantially as described hereinafter, a chimney surmounted with a damper or its equivalent, so as to prevent any undue chilling of the lime in the kiln, as explained hereinafter.

In order to enable others skilled in the art to make and use my invention, I will now proceed to describe its construction and operation.

On reference to the accompanying drawings, which form a part of this specification, Figure 1 represents a view of my improved limekiln in perspective; Fig. 2, a sectional view; Figs. 3 and 4, detached sectional views of parts of the kiln; Fig. 5, an inverted plan view of the cooler and its appliances; Fig. 6, a plan of the lid for closing the cooler.

Similar letters refer to similar parts throughout the several views.

'is the base of the limekiln, and consists of ual substantial masonry, an archway, X, of proper dimensions, being formed in this base, in order to permit suitable trucks or barrows, Y, to be moved to a position beneath what I term the "cooler" F. This cooler, which will be more minutely described hereinafter, is attached to the top of the archway and communicates with the interior W of the kiln, the latter being lined with fire-brick.

On the top of the base C is erected a chimney, composed of the tapering portion B and upper portion, A, the interior of this chimney forming a continuation of the interior W of the furnace.

To the chimney, near the top of the same, are secured the two brackets *j j*, in which a shaft, *k*, carrying a lever, *i*, to one arm of which is suspended a damper, I, of sufficient dimensions to close the top of the chimney, a chain, K, being suspended to the other arm of the lever.

A fire-place, M, furnished in front with suitable doors, is formed in the base C at each side of the same, and beneath the grate of each fire-place is an ash-pit, N, the products of combustion from the fuel passing through inclined flues P into the interior of the kiln.

S is the opening through which the limestone is thrown into the kiln, this opening being furnished with an appropriate door.

To the lower and smaller end of the cooler F and at the point *t* are hinged the two blades L L, having projecting levers *l l*, which move in suitable guides, *m m*. A tray-like lid, G, is also hung beneath the blades L to the lower end of the cooler F, the tray being provided with an arm, *m*, which may be connected by the chain K to the lever *i* of the damper. This lid is more than sufficient in extent to close the lower end of the cooler, and is slotted on the two sides to admit the guides or supporting-rods *m m*.

D D are tubes through which the condition of the burning lime may be inspected.

In starting the kiln, in the first instance, the cooler F and the lower portion of the interior of the kiln are filled with clay, mold, or other refuse, on which the charge of limestone rests. After the stone has been properly calcined by the heat passing from the fire-places through the inclined flues P, this body of clay or mold may be removed, and the calcined stone allowed to fall into the cooler. As this cooler projects downward into the archway, and is exposed to the free circulation of the external air, its contents must soon become cool and in a proper condition to be discharged into a truck or barrow. In order to effect this discharge of the lime from the cooler, the tray G is depressed, as shown by dotted lines, Fig. 4. The lime, however, is still supported by the blades L, which can be readily moved apart from each other by the levers *l*, thereby permitting the desired quantity of lime to fall from the cooler into the truck, after which the blades are moved toward each other so as to cover the lower end of the hopper as much as possible and prevent the escape of more of the lime than is required. After this the tray is elevated so as to close the bottom of the cooler, sand or waste powdered lime being deposited within the flanges of the tray, so as to effectually prevent the access of air through the cooler to the kiln.

It is of importance that no air should gain access to the burning lime, as it would chill the same, and retard the continuous process of burning. Prior to depressing the tray G therefor, and exposing the lower end of the cooler, the damper I is lowered onto the top of the chimney, thereby checking the draft, so that there can be no tendency for the air to enter from below.

The lever of the damper may be so connected to that of the tray that the depression of the latter would insure the closing of the top of the chimney, and the raising of the tray to close the cooler would insure the elevating of the damper. This connection of the damper to the tray, however, may be dispensed with if proper care be exercised by the operator.

It will be seen that the interior of the kiln between the points *x x*—that is, at the bottom of the inclined flues P P—is wider than other other portions of the interior; or, in other words, that portion of the kiln below the flues is funnel-shaped, as represented in Fig. 2. This arrangement serves the important duty of preventing particles of lime in descending from that portion of the kiln above the flue to the portion below the same from passing into and choking the said flues.

My improved kiln is perpetual in its action, and may be in operation night and day, and the lime discharged from the cooler every hour or thereabout; or, if its operation during the night is not required, the damper I may be lowered onto the top of the chimney and all apertures for the admission of air to the kiln and fire-places closed in the evening, and the operation to be resumed in the morning by simply raising the damper I and trimming the fires.

Even if the draft be checked on Saturday night the kiln will be in a condition to at once resume operations on the Monday morning following without any emptying of the kiln or relighting the fires.

Having now described the construction and operation of my improved limekiln, I wish it to be understood that I do not desire to claim of itself the chimney and movable damper I, the same having been heretofore used in connection with furnaces; nor do I claim the within-described arrangement of the fire-places in respect to the interior of the kiln, a similar arrangement having been hereretofore adopted; but

I claim as my invention, and desire to secure by Letters Patent—

1. The cooler F beneath the kiln, communicating therewith, and exposed to the air, all substantially as described.

2. In combination with the said cooler, the beveled blades I, so arranged and operating as to support the lime within the said cooler and to permit the lime to fall therefrom, substantially as described.

3. The tray-like lid G, when hung to the cooler and arranged for closing the same, substantially as specified.

4. Making that part of the interior of the kiln beneath the flues of the funnel form illustrated and described, for the purpose specified.

5. Combining with a limekiln, substantially as described, a chimney surmounted with a damper, T, or its equivalent, for the purpose specified.

In testimony whereof I have signed my name to this specification before two subscribing witnesses.

RICHARD his × mark. DONALDSON.

Witnesses:
DAVID KEEPORT,
EDW. B. ENGLISH.